J. HESTER.
Outside Window-Blind.

No. 201,415.  Patented March 19, 1878.

WITNESSES:
H. Rydquist
J. H. Scarborough

INVENTOR:
J. Hester
BY Munn & Co
ATTORNEYS.

UNITED STATES PATENT OFFICE.

JAMES HESTER, OF KNOXVILLE, ILLINOIS.

IMPROVEMENT IN OUTSIDE WINDOW-BLINDS.

Specification forming part of Letters Patent No. 201,415, dated March 19, 1878; application filed September 29, 1877.

*To all whom it may concern:*

Figure 1:
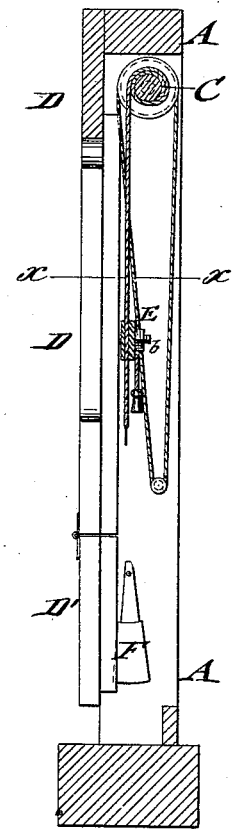
Figure 2:
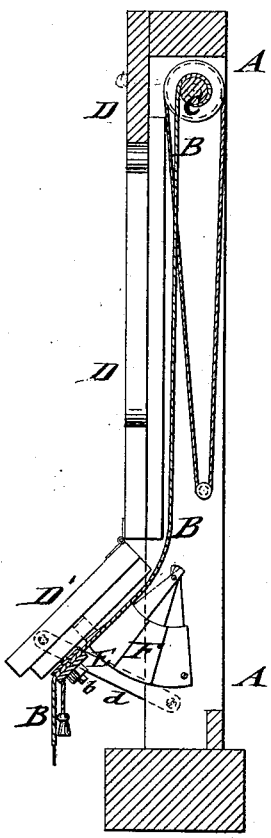
Figure 3:
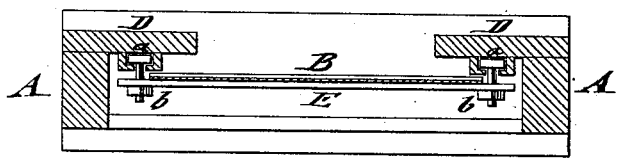

Be it known that I, JAMES HESTER, of Knoxville, in the county of Knox, and State of Illinois, have invented a new and Improved Outside Window-Blind, of which the following is a specification:

In the accompanying drawing, Figures 1 and 2 represent vertical transverse sections of my improved outside blind for windows, showing the same, respectively, in lowered position, and as thrown out to form an awning; and Fig. 3 is a horizontal section of the same on line $x\ x$, Fig. 1.

Similar letters of reference indicate corresponding parts.

This invention relates to an improved outside blind for windows that may be adjusted at any height, and drawn up to be protected against storm, or may be arranged in the nature of an awning, to admit air, but keep out the sun.

The invention consists of a blind winding up on a roller, and being stretched by a lateral bottom piece or stretcher, guided by set-screws along inside grooves of an outer face-frame attached to the window-casing. The lower part $s$ of the side sections of the face-frame are hinged, and connected by folding and fan-shaped side sections to the window-casing, forming, with the blind stretched across the same, an awning that is supported by brace-rods.

Referring to the drawing, A represents the window-casing, which is provided with an outside blind, B, of canvas or other suitable fabric.

The blind B may be wound up on a roller, C, at the top part of the casing A by means of a roller-cord, spring-roller, or in other approved manner.

To the outside of the window-casing A is attached a face-frame, D, that may be permanently or detachably applied to the casing, being made of a top section and side sections, which have longitudinal guide-grooves $a$ at the inside.

The side sections run down to the window-sill, or to a short distance from the same, and have hinged lower parts D' of about half the height of the window-casing, more or less. The inside grooves or channels $a$ of the face-frame run up to roller C, and serve to guide the lateral stretching-piece E, that is secured to or near the lower part of the blind by means of set-screws $b$, whose heads run in the grooves, while their thumb-screws admit the rigid fastening of the stretching-piece to any height, to keep the blind in steady position, and prevent the flapping about in the wind.

The top section of the face-frame extends below the casing, so as to form a protection for the blind in bad weather, or when wound up on the roller.

The blind may be adjusted into any desired position by being wound, and having the stretching-piece secured by its guiding and tightening screws and nuts to the outer frame, the stretching-piece being also run into the hinged parts D' and fastened thereto, so as to admit the throwing out of the blind with the same, forming thereby an awning.

The outer edges of the hinged parts D' are connected with the window-casing by pivoted and folding sections or wings F, which open and close in the nature of a fan, and form the sides of the awning. The hinged parts D' may be supported in outwardly-inclined position by brace-rods $d$ of the window-casing, which are attached to eyes, staples, or pins of the parts D', to retain the awning in position, as shown in Fig. 2. The hinged awning part of the blind admits free ventilation and a view to the outside, so as to combine the advantages of an awning with that of an outside protecting-blind.

Having thus described my invention, I claim as new and desire to secure by Letters Patent—

1. In combination with the casing A, the detachable face-frame D, having the grooves $a\ a$ on its inner side, and the hinged sections D', substantially as described.

2. The combination of the outer protecting face-frame, grooved at the inside, and having hinged lower parts, with the adjustable outside blind, curtain, or screen, having lower stretching-piece, with guide and set-screws, and with or without folding and fan-shaped side sections, to form an awning, substantially as specified.

JAMES HESTER.

Witnesses:
SAMUEL G. MARSH,
EDWIN A. CORBIN.